J. A. McCLURE.
Steam-Baker and Cooker.
No. 204,353. Patented May 28, 1878.
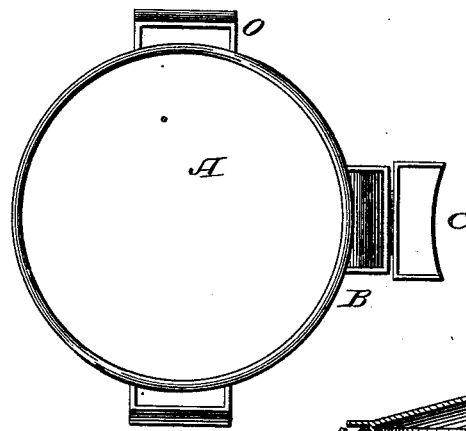
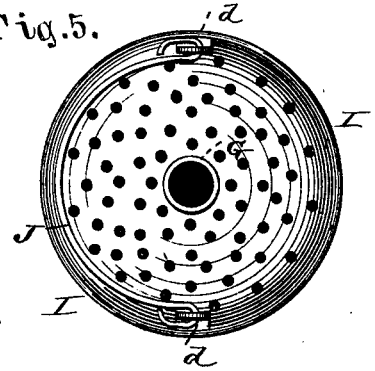
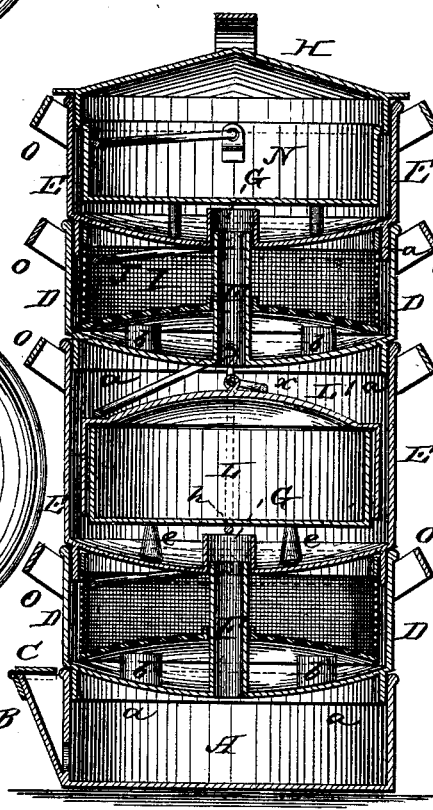
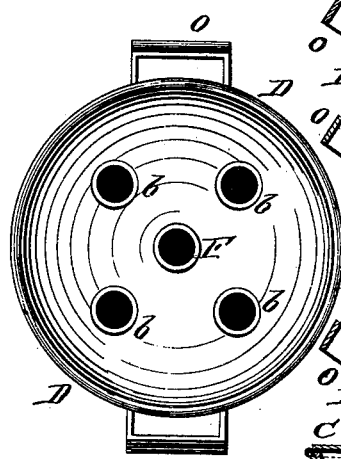
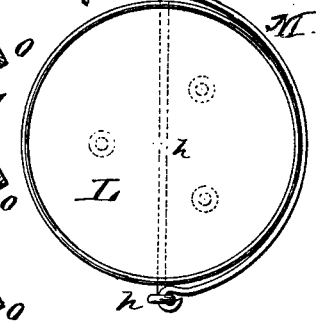
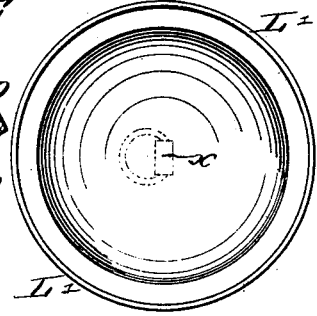
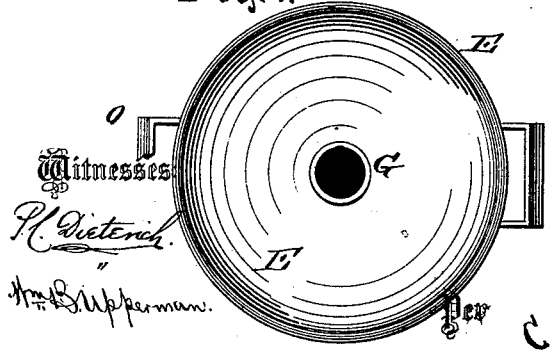
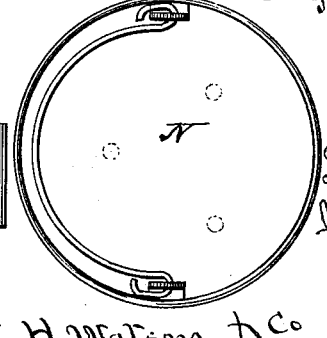

UNITED STATES PATENT OFFICE.

JOSEPH A. McCLURE, OF MOLINE, ILLINOIS.

IMPROVEMENT IN STEAM BAKERS AND COOKERS.

Specification forming part of Letters Patent No. 204,353, dated May 28, 1878; application filed May 1, 1878.

*To all whom it may concern:*

Be it known that I, JOSEPH A. MCCLURE, of Moline, in the county of Rock Island and State of Illinois, have invented certain new and useful Improvements in Steam Baker and Cooker; and I do hereby declare that the following is a full, clear, and exact description thereof, which will enable others skilled in the art to which it appertains to make and use the same, reference being had to the accompanying drawing, and to the letters of reference marked thereon, which form a part of this specification.

The nature of my invention consists in the construction and arrangement of a steam baker and cooker, as will be hereinafter more fully set forth.

In the annexed drawing, Figure 1 is a central vertical section of the entire steam baker and cooker. Fig. 2 is a plan view of the steam-generator. Figs. 3 and 4 are plan views of two forms of steaming-vessels. Fig. 5 is a plan view of a device for holding vegetables to be steamed. Fig. 6 is a plan view of the baker with the top removed. Fig. 7 is an inverted view of the top. Fig. 8 is a plan view of a sauce-pan.

A represents the bottom vessel or steam-generator, provided at one side with a spout, B, having a hinged cover, C, as shown. Through this spout the generator is supplied with water, as required, for the generation of steam. On top of the generator A are placed, one above the other, any desired number of vessels, which are made of two different forms, and marked, respectively, D and E. The bottoms of all these vessels are concaved, as shown, forming their under sides convex, and they have downwardly-projecting side flanges a a to fit inside of the vessel underneath.

Each vessel D is formed with a central upwardly-extending tube, F, which is of sufficient length to project into a short central tube, G, in the bottom of the vessel E above it. The bottom of the vessel D has also a series of short tubes, b b, as shown, so that the steam from the boiler or generator A will be by the tubes b conducted into the first vessel D, while the central tube F conducts steam directly into the first vessel E. From this vessel E the steam is in like manner, through the short tubes b, conducted into the second vessel D, and a central tube, F, conducts it into the second vessel E, this last vessel being provided with a close-fitting cover, H.

Each vessel D is provided with an interior receptacle or vessel, I, the sides and bottom of which are made of perforated sheet metal, and the bottom curved upward, with a central aperture to pass over the tube F, and the form of the bottom makes it clear the small tubes b, and gives free access for the steam. This perforated vessel is intended for steaming vegetables, which are by it kept away from the condensed steam; and the vessel is provided with a bail, J, hooked into ears d on the vessel, so that it can easily be lifted out with its contents.

In the first vessel E is placed a bread-pan, L, which is provided with feet e e underneath to rest upon the bottom of the vessel. This bread-pan is also provided with a cover, L', in the shape of an inverted pan fitting loosely around the outside of the pan L.

When the dough is put in the pan L the lid or cover L' is put down over it, and as the bread rises it lifts said cover with it.

The pan L has a rod, h, attached under the center to the bottom, and the ends of this rod are bent upward and extend a sufficient distance above the pan, so that a bail, M, attached to their extreme ends will not interfere with the rising of the cover L'.

In the top vessel E is placed a pan, N, for puddings, sauce, &c., which pan is also provided with feet and with a bail. The boiler A, as well as all the outside vessels, is provided with handles O O, as shown.

In the top of the bread-pan cover L' is a small vent, x, for the escape of air and steam from the bread.

Having thus fully described my invention, what I claim as new, and desire to secure by Letters Patent, is—

The combination of the vessel I, made of perforated sheet metal, the bottom being curved upward with central opening, the vessel D with central tube F, and tubes b with the vessel E, having short tube G, substantially as and for the purpose set forth.

In testimony that I claim the foregoing as my own I have hereto affixed my signature in presence of two witnesses.

JOSEPH A. McCLURE.

Witnesses:
WILLIAM JACKSON,
A. M. HUBBARD.